United States Patent [19]

Ranganathan

[11] Patent Number: 5,764,201
[45] Date of Patent: Jun. 9, 1998

[54] MULTIPLEXED YUV-MOVIE PIXEL PATH FOR DRIVING DUAL DISPLAYS

[75] Inventor: Ravi Ranganathan, Cupertino, Calif.

[73] Assignee: NeoMagic Corp., Santa Clara, Calif.

[21] Appl. No.: 635,619

[22] Filed: Apr. 22, 1996

Related U.S. Application Data

[63] Continuation-in-part of Ser. No. 586,583, Jan. 16, 1996.

[51] Int. Cl.$^6$ .................................................. G09G 5/00
[52] U.S. Cl. ........................ 345/3; 345/132; 345/520; 348/589
[58] Field of Search ............................ 345/3, 520, 132, 345/501, 502, 526; 348/584, 588, 589, 591, 594

[56] References Cited

U.S. PATENT DOCUMENTS

| | | | |
|---|---|---|---|
| 4,845,640 | 7/1989 | Ballard et al. | 364/518 |
| 4,860,246 | 8/1989 | Inoue | 364/900 |
| 5,124,688 | 6/1992 | Rumball | 340/703 |
| 5,220,312 | 6/1993 | Lumelsky et al. | 348/589 X |
| 5,258,826 | 11/1993 | Wakeland et al. | 358/12 |
| 5,285,192 | 2/1994 | Johary et al. | 345/3 |
| 5,309,168 | 5/1994 | Itoh et al. | 345/3 |
| 5,387,923 | 2/1995 | Mattison et al. | 345/103 |
| 5,402,147 | 3/1995 | Chen et al. | 345/115 |
| 5,402,513 | 3/1995 | Schafer | 382/47 |
| 5,448,257 | 9/1995 | Margeson, III et al. | 345/3 |
| 5,475,402 | 12/1995 | Hijikata | 345/211 |
| 5,479,183 | 12/1995 | Fujimoto | 345/3 |
| 5,479,184 | 12/1995 | Tokumitsu | 345/3 |
| 5,488,385 | 1/1996 | Singhal et al. | 345/3 |
| 5,491,496 | 2/1996 | Tomiyasu | 345/3 X |
| 5,608,418 | 3/1997 | McNally | 345/3 |
| 5,673,058 | 9/1997 | Uragami et al. | 345/3 |
| 5,694,141 | 12/1997 | Chee | 345/3 X |
| 5,710,570 | 1/1998 | Wada et al. | 345/3 |

FOREIGN PATENT DOCUMENTS 9530220  11/1995  WIPO.

OTHER PUBLICATIONS

"Double Vision: Appian's Impulse Graphics Card Gives Your Monitor a View—or Two" A. Poor, PC Magazine, May 14, 1996, p. 54.

Primary Examiner—Steven J. Saras
Assistant Examiner—Seth D. Vail
Attorney, Agent, or Firm—Stuart T. Auvinen

[57] ABSTRACT

A graphics controller has a standard RGB graphics pixel path from a graphics memory. A second path from the graphics memory transfers movie-overlay pixels in YUV format. Two pixel muxes are used. Each pixel mux selects either RGB graphics pixels or YUV movie pixels converted to the RGB color space. A first pixel mux loads either the graphics or the movie pixels to a path to the external CRT. A second pixel mux loads either the graphics or the movie pixels to an LCD path leading to a flat-panel LCD display. The pixel muxes can act in unison to display the same image on both the external CRT and the local LCD panel, and the movie pixels may be overlaid as a small window over the graphics data. The pixel muxes can also act separately so that different images are displayed on the external CRT and the local LCD panel. One pixel mux selects the RGB pixels while the other pixel mux selects the converted YUV pixels. The RGB pixels can be displayed on the LCD panel as graphics data such as speaker's notes, while the YUV pixels can be displayed as a full-screen movie window on the external CRT to an audience. Thus a single graphics controller in a portable PC can drive two different images—one for the audience on the external CRT and a second for the speaker on the portable PC's LCD panel display.

20 Claims, 8 Drawing Sheets

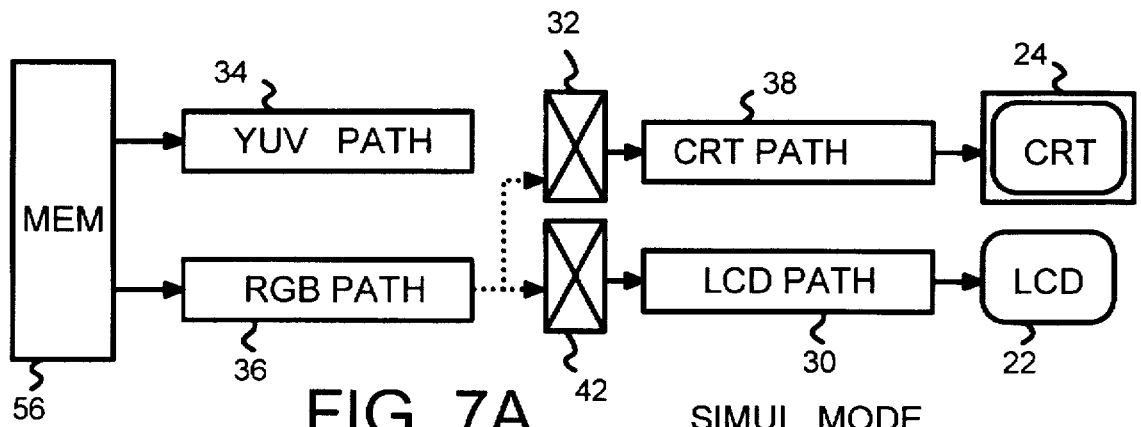
FIG. 7A  SIMUL. MODE
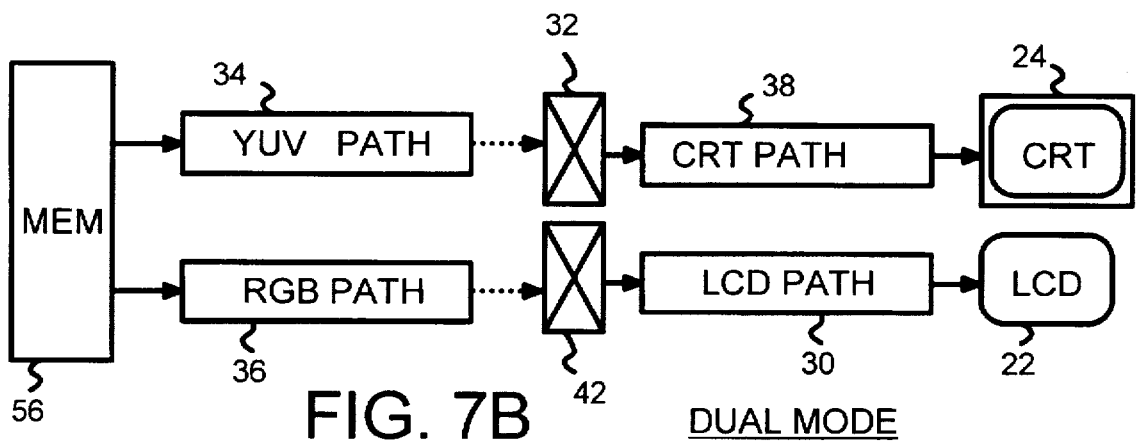
FIG. 7B  DUAL MODE
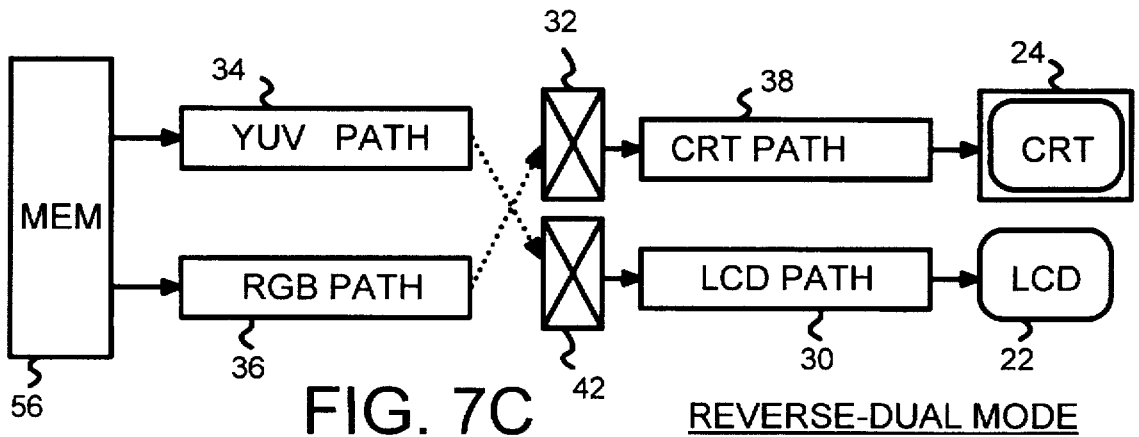
FIG. 7C  REVERSE-DUAL MODE

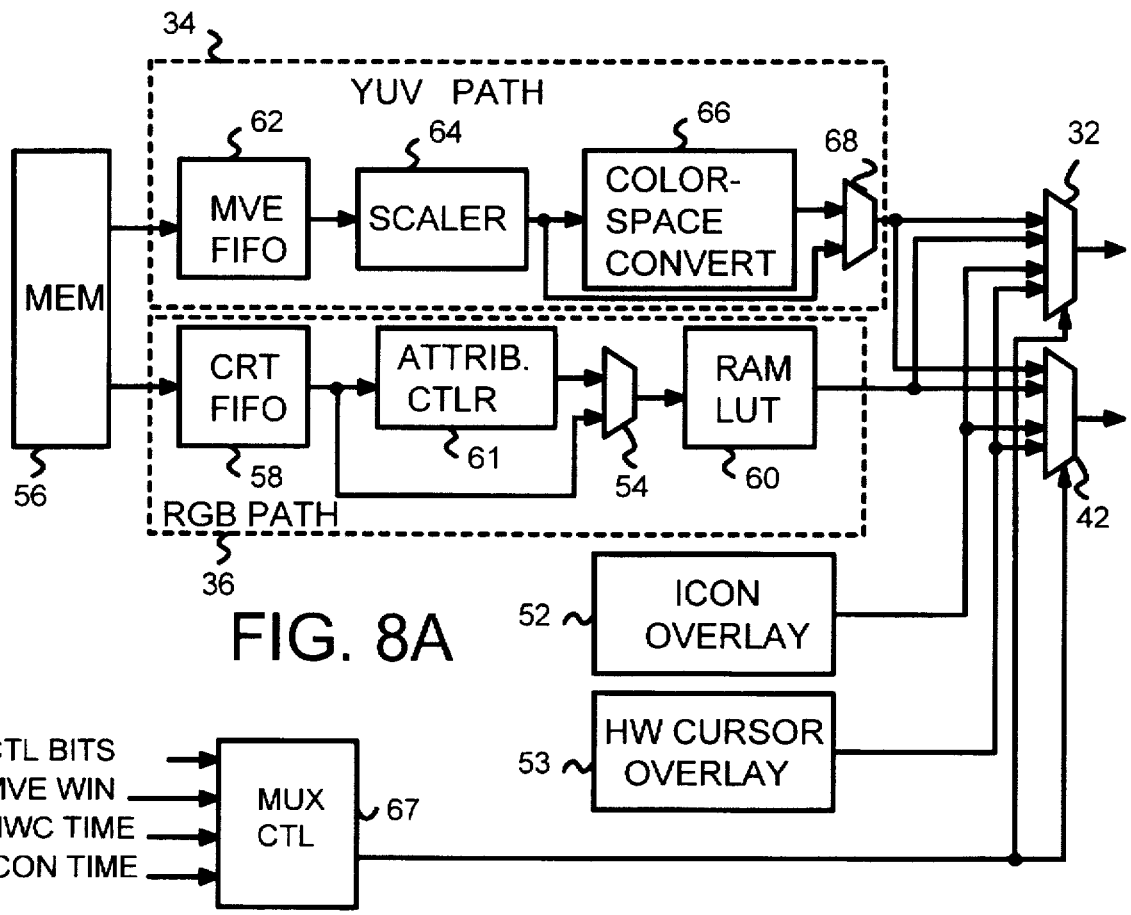
FIG. 8A
FIG. 8B
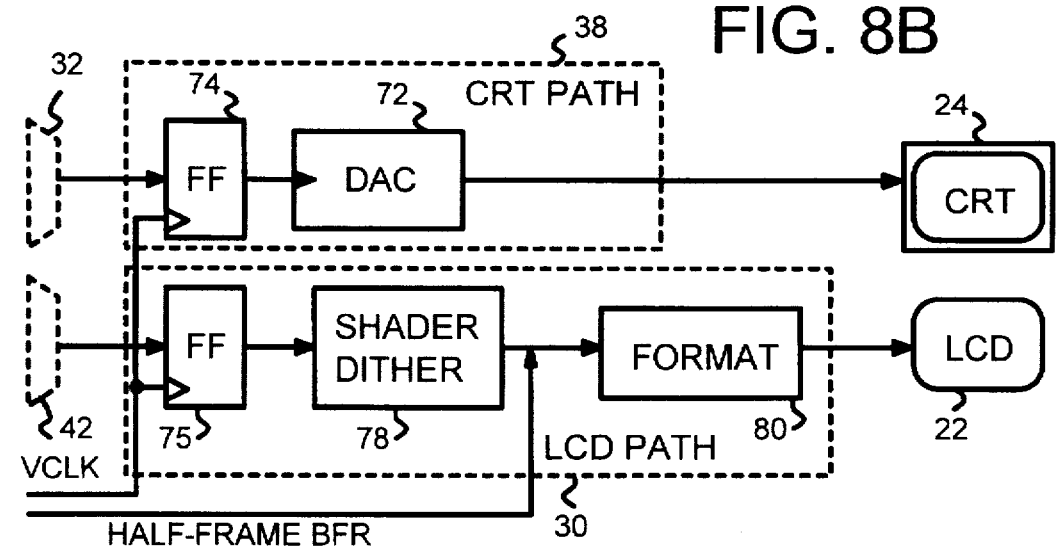

MULTIPLEXED YUV-MOVIE PIXEL PATH FOR DRIVING DUAL DISPLAYS

RELATED APPLICATION

This application is a continuation-in-part (CIP) of "Transparent Blocking of CRT Refresh Fetches During Video Overlay Using Dummy Fetches", U.S. Ser. No. 08/586,583, filed Jan. 1, 1996 having a common inventor and assigned to the same assignee.

BACKGROUND OF THE INVENTION

1. Field of the Invention

This invention relates to graphics controllers, and more particularly video display subsystems driving both a CRT and a flat-panel display.

2. Description of the Related Art

New display technologies allow small, portable laptop, notebook, and hand-held personal computers (PC's) to be built. These portable PC's use flat-panel displays of liquid-crystal-display (LCD) or active-matrix technologies. Video or graphics controllers to drive these flat-panel displays have improved in performance so that today's laptop PC users enjoy higher resolution and higher-performance graphics.

However, desktop PC's provide even higher resolution displays than do portable PC's, and thus docking stations are popular which connect the portable PC to a higher-resolution cathode-ray-tube (CRT) display. When docked, the portable PC's graphics controller drives the analog voltages representing the picture elements or pixels and the synchronization clocks to the CRT monitor, thus displaying the image generated by the portable PC onto the CRT monitor. Sometimes the portable PC's flat-panel display is not used when the CRT is attached, but at other times both the flat-panel display and the CRT are used.

Simultaneous Display on Flat Panel and External CRT

Many portable PC's have a connection for a cable to a cathode-ray tube (CRT) so that the portable PC can drive a CRT display. Usually both the CRT display and the flat panel display on the portable PC are simultaneously driven. This simultaneous display is usually known as "simulscan" since the pixels are driven from the PC's graphics controller to both the CRT and the flat panel at the same time. See U.S. Pat. No. 5,448,260 by Zenda et al. assigned to Toshiba, which simultaneously drives both an LCD panel and a CRT. FIG. 1 shows laptop PC 20 having a flat-panel LCD panel 22 being driven at the same time as external CRT 24 is being driven. The displayed image is viewed on both LCD panel 22 and external CRT 24.

Display Built Up from Lines of Pixels

FIG. 2 is a diagram of a display, which could be a cathode-ray-tube (CRT) video display, or a flat-panel liquid-crystal display (LCD) or other type of display. An image is formed on the display screen by selectively energizing or illuminating small dots or pixels on the screen which are the smallest picture elements. In a CRT, a pixel is energized by an electron gun that directs a beam of energizing electrons to a particular point on the screen. The electron beam is scanned from left to right in a horizontal line and pulsed to illuminate some points on the line but not others. The screen is divided into a number of horizontal lines 10, 12, 16, with each line comprising a number of pixels. The pixels in a line are illuminated by a CRT one-by-one from the left side to the right side of a horizontal lines 10, 12, 16.

Once the entire horizontal line 10, 12, 16 has been scanned, the electron beam is disabled or "blanked" so that no pixels are energized and the electron beam is re-traced back to the beginning on the next horizontal line 12. This horizontal re-trace 14 follows a diagonal path. After re-trace, the blanking is ended and the next horizontal line 12 is scanned. The process of scanning a horizontal line and re-tracing is repeated until all lines are scanned. Once scanning of the last horizontal line 16 is complete, the electron beam is returned to the beginning of the first line 10 by a vertical re-trace 18. The electron beam is again blanked to prevent any illumination while the electron beam is being retraced to the top of the screen.

Flat-Panel Displays Do Not Require Re-Trace Period, Use Different Format

Other display technologies also divide a screen into horizontal lines comprised of pixels that are either illuminated or not. A horizontal recovery or blanking period between horizontal lines and a vertical recovery or blanking period to return to the top of the screen may also be necessary with these display technologies, even though an electron beam is not used. However, for flat-panels displays, this recovery time to begin a new line or new screen is much smaller than the blanking period for a CRT. CRT's require a large blanking time because the electron beam must be physically moved or retraced to another place on the screen. Flat-panels do not use an electron beam and thus require no retrace period. Flat-panel displays also use a different format for the pixels received.

PC Presentations Use Both CRT & Flat-Panel Displays

Both the flat-panel and the CRT display are often used when giving a presentation to an audience. The CRT may be a large display or even a projector that displays the computer-generated presentation to the audience. The presenter views the same presentation from his flat-panel display. The image displayed to the audience on the CRT is the same image viewed on the flat-panel display of the portable PC. When the flat-panel display has a lower resolution than the CRT, then the CRT's resolution must be limited to the lower resolution of the flat-panel display, or the flat-panel must be disabled.

Ideally, the flat-panel display on speaker's portable PC would display a different image than the image being displayed to the audience on the CRT. The speaker often must use means on the presenting program to adjust the presentation, and it is desirable to hide these menus from the audience. The speaker may also have notes which are stored with the presentation that he does not wish to display to the audience, but that would be useful to display on the speaker's portable PC. The speaker may wish to open up another file or application on his portable PC to respond to a question from the audience, but this cannot be done without interrupting the audience's display on the CRT and allowing the audience to also view these files.

Video conferencing is another application where different images are desirably displayed. One monitor may show the person spoken to, while another monitor may show a drawing on a white-board. This currently requires two separate video controllers.

Despite these potential advantages, current technology does not allow for display of two different images without adding an entire second graphics subsystem, which is not practical for a portable PC.

CRT Limited by Resolution of Flat-Panel Display

Higher-resolution CRT's are often refreshed at a higher rate than flat panels. Most flat-panel displays are refreshed at 60 Hz (or 120 Hz for dual-scan panels), which is fixed by the panel manufacturer. However, CRT manufacturers design for a higher refresh rate of 75 or 85 Hz, which reduces flicker and meets ergonomic standards.

Unfortunately, when the CRT is driven by the portable PC the CRT must be refreshed at the lower rate of the flat-panel display, 60 Hz, due to the limitations of the flat-panel which can be driven only up to 60 Hz in the usual case.

Higher-resolution CRT's are also capable of displaying more horizontal lines, and more pixels per line than many flat-panel displays. The CRT must run at a lower resolution when the portable PC's flat-panel display is also being used. This is undesirable.

What is desired is a graphics controller for a portable PC which can simultaneously drive both a flat-panel display and an external CRT. It is desired to drive different images to the flat-panel display on the portable PC and to the external CRT using the same graphics controller. It is further desired to refresh the CRT at a higher rate than the flat-panel, and to use the higher resolution of the CRT while also driving the lower-resolution flat-panel display.

SUMMARY OF THE INVENTION

A dual-path graphics controller drives pixels to a flat-panel display and to a cathode-ray-tube (CRT) monitor. The dual-path graphics controller has a first path coupled to a graphics memory storing pixels for display. The first path receives graphics pixels from the graphics memory. The first path has a first output. A second path is also coupled to the graphics memory. It receives movie-overlay pixels from the graphics memory. The second path has a second output.

A first pixel mux and a second pixel mux are each coupled to the first output and coupled to the second output. Each pixel mux selects graphics pixels from the first output or movie-overlay pixels from the second output. The first pixel mux has a first mux output and the second pixel mux has a second mux output.

A CRT path is coupled to the first mux output of the first pixel mux. It transfers pixels to the CRT monitor. A panel path is coupled to the second mux output of the second pixel mux. It transfers pixels to the flat-panel display.

Simultaneous control means is coupled to the first pixel mux and to the second pixel mux. It causes both the first and the second pixel muxes to select graphics pixels from the first path when graphics data is displayed, but select movie-overlay pixels from the second path when movie-overlay data is displayed. The CRT monitor displays a same image as displayed on the flat-panel display when the simultaneous control means is active.

Dual control means is coupled to the first pixel mux and to the second pixel mux. It causes the first and the second pixel muxes to select different pixels. The second pixel mux selects graphics pixels from the first path but the first pixel mux selects movie-overlay pixels from the second path when graphics data is displayed on the flat-panel display and movie-overlay data is displayed on the CRT monitor. The CRT monitor displays a different image than an image displayed on the flat-panel display when the dual control means is active.

Thus different images or the same image are displayed on the CRT monitor and the flat-panel display.

In further aspects of the invention the first path and the second path each are a pipeline containing a plurality of stages for transferring pixels in response to a pixel clock. The first path receives the pixel clock, and the second path receives the pixel clock.

In still further aspects of the invention the first path includes a first buffer for buffering graphics pixels from the graphics memory. The second path includes a second buffer for buffering movie-overlay pixels from the graphics memory. The first buffer and the second buffer outputs pixels in response to the pixel clock. The CRT path includes a digital-to-analog converter (DAC) which converts digital graphics pixels to analog voltages for output to the CRT monitor. The DAC outputs a pixel in response to the pixel clock.

In other aspects a clock generator generates the pixel clock. The clock generator generates a horizontal line clock by dividing the pixel clock. A vertical clock is generated by dividing the horizontal line clock. The vertical clock indicates when a new frame of pixels is to begin. The new frame includes a plurality of horizontal lines signaled by the horizontal line clock. The vertical clock and the horizontal line clocks are output to both the CRT monitor and to the flat-panel display. Thus the CRT monitor and the flat-panel display are refreshed synchronously to each other.

BRIEF DESCRIPTION OF THE DRAWINGS

FIGS. 7A, 7B, 7C highlight several modes of operation of the dual graphics controller including simultaneous and dual modes.

FIGS. 8A, 8B are a detailed block diagram of the dual graphics controller which can display the same or different images on the two displays.

DETAILED DESCRIPTION

The present invention relates to an improvement in graphics controllers. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Parent Application Described Video Overlay

The graphics image of the screen is built up pixel-by pixel under program control. These pixels are often in color, using a red-green-blue (RGB) color-space coding for the graphics pixels. A moving-video window may be overlaid on the graphics image. The parent application disclosed a graphics controller with a second path for moving-video overlay or "movie" pixels, which are in luminence-chrominance (YUV) format.

Full-motion video images are partially or fully superimposed over the graphics image. Rather than being strictly computer-generated, like the graphics data, the video overlay, herein referred to as movie overlay, can come from a real-time video source such as a television receiver or video camera, or perhaps from a video playback device such as a CD-ROM. The video overlay image is typically in the YUV color-space encoding rather than RGB. Thus the video overlay is not directly compatible with the graphics image. The video overlay pixels are normally converted to RGB and then muxed into the pixel stream just before being output to the display monitor.

Figure 1:
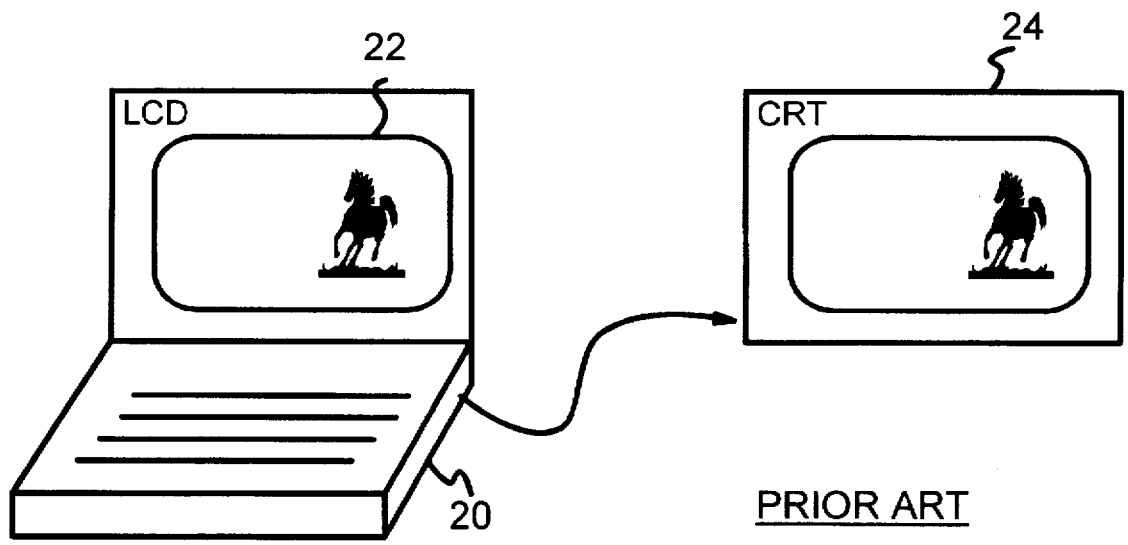
FIG. 1 shows laptop PC having a flat-panel LCD display being driven at the same time as external CRT is being driven.
Figure 3:
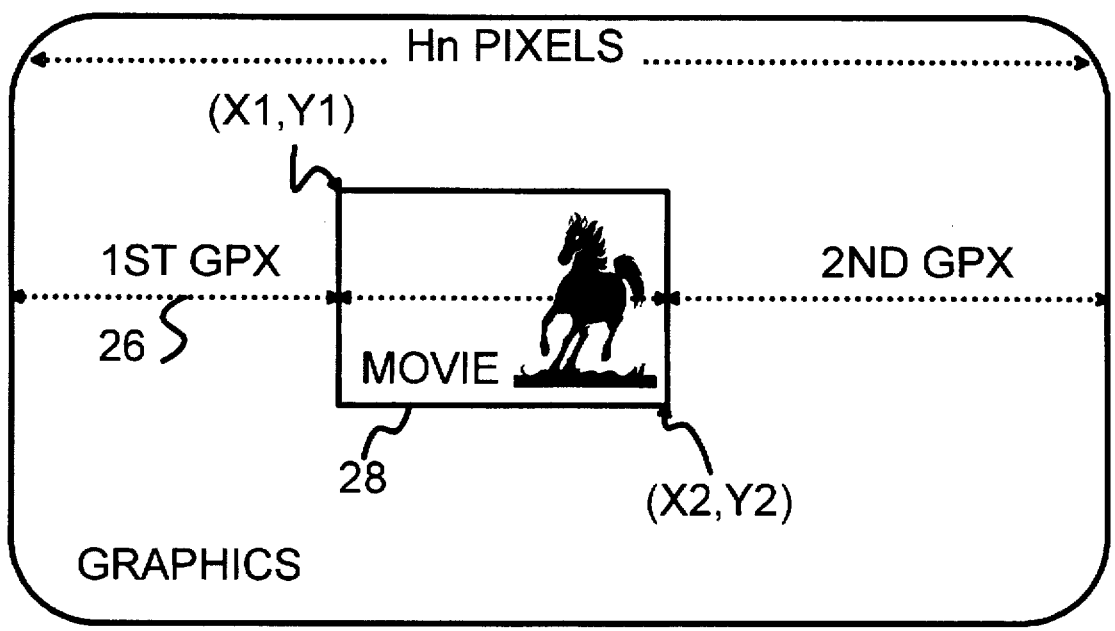
FIG. 3 shows a screen of graphics data overlaid with a movie window.
Figure 2:
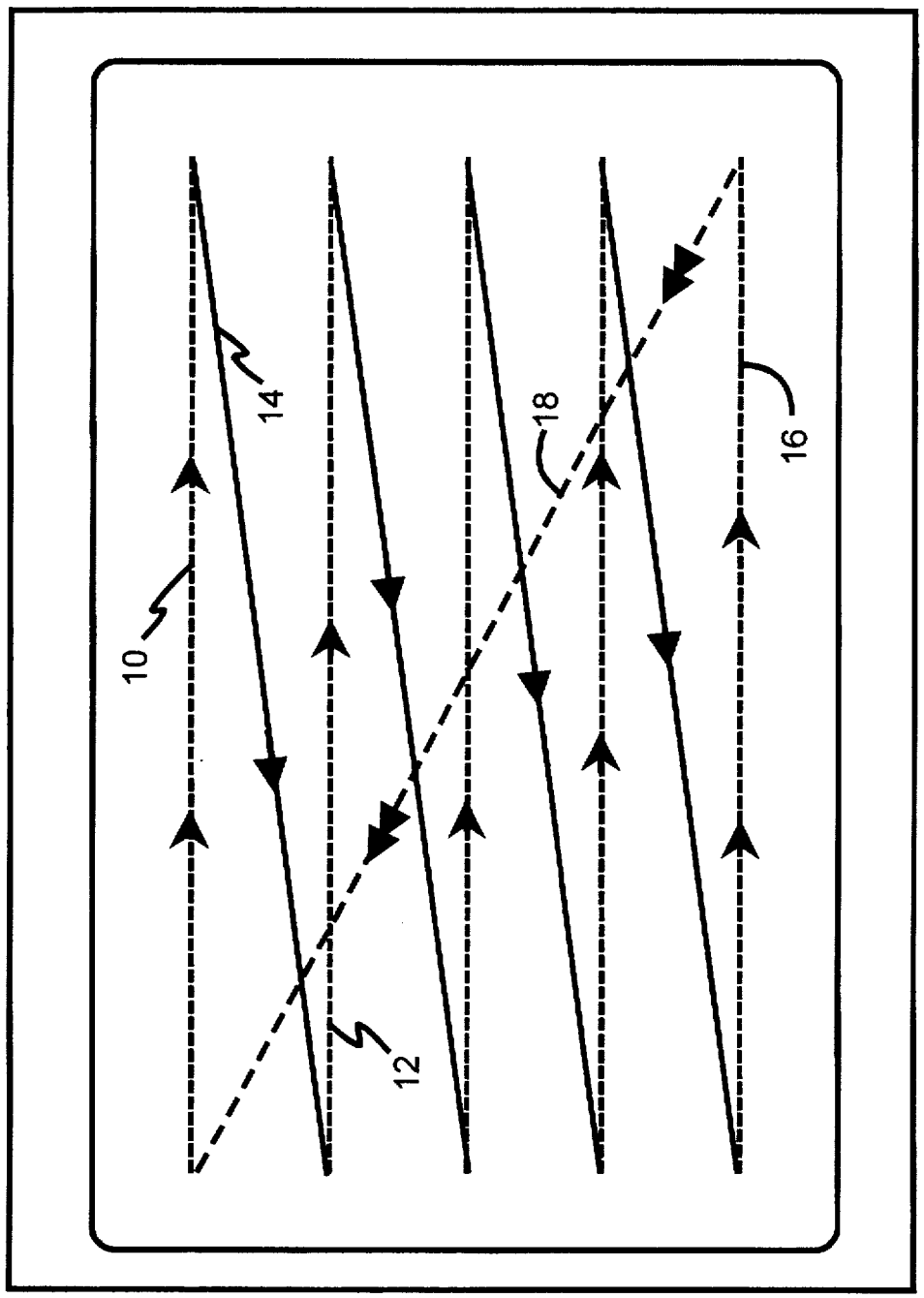
FIG. 2 is a diagram of a display, which could be a cathode-ray-tube (CRT) video display, or a flat-panel liquid-crystal display (LCD) or other type of display.

FIG. 3 shows a screen of graphics data overlaid with a movie window. Each horizontal line of pixels contains Hn pixels. VGA 640×480 resolution has 480 lines of 640 pixels per line. Movie window 28 is overlaid on 'top' of the graphics screen data so that the graphics data underneath movie window 28 is not visible. Movie window 28 is also known as a movie envelope, and the coordinates (in pixels) of the upper left corner of movie window 28 (X1,Y1) and the lower right corner (X2,Y2) define the size and location within the graphics screen. A horizontal scan line 26 which passes through movie window 28 has three regions:

1. 1ST GPX region from pixel 1 to pixel X1-1 contains graphics data;
2. MOVIE region from pixel X1 to pixel X2 contains full-motion-video data;
3. 2ND GPX region from pixel X2+1 to end of line, pixel Hn, contains graphics data.

Only horizontal scan lines between lines Y1 and Y2 have these three regions and require special processing; other lines contain only graphics data and no movie data.

A pixel mux selects movie overlay pixels during the movie window but select graphics pixels during the first and second graphics regions, and for lines entirely outside of the movie window. This pixel mux is controlled by a comparison of the current pixel passing through the pixel mux with X1 and X2. When the pixel is between X1 and X2, then the movie window is being displayed, and the movie pixels are selected. Otherwise the graphics pixels are selected. See for example, U.S. Pat. No. 5,404,437, and U.S. Pat. No. 5,293,540.

Figure 4:
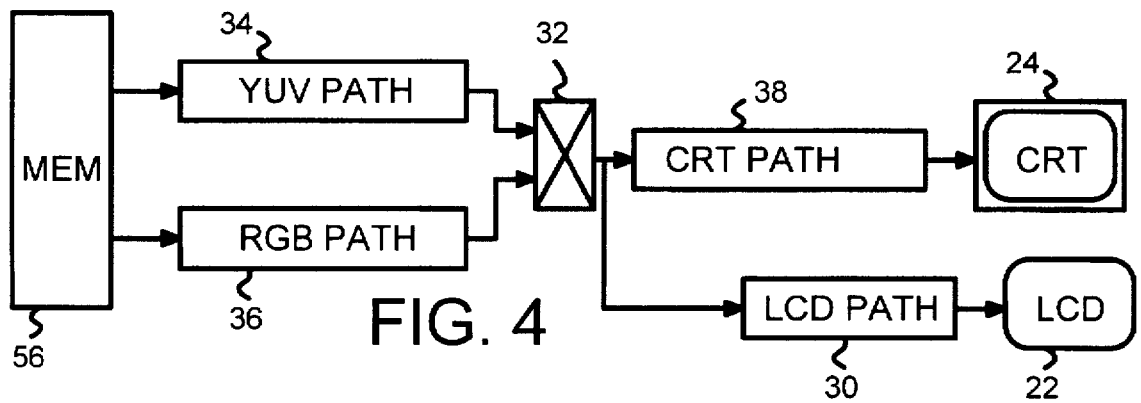
FIG. 4 illustrates a graphics controller with movie overlay capability, as described in the parent application.

Graphics Controller with Video Overlay—FIG. 4

FIG. 4 illustrates a graphics controller with movie overlay capability, as described in the parent application. Graphics memory 56 is loaded with pixel data by a host bus, such as a PCI bus on a PC. The pixel data forms a pixel-map of the screen which is stored in graphics memory 56 with the graphics pixels in RGB format. Graphics memory 56 also contains a portion or region which is loaded with movie pixels in YUV format.

Graphics pixels in RGB format are read from graphics memory 56 and loaded into a FIFO buffer in RGB path 36. RGB path 36 is a pipeline which modifies these graphics pixels with attributes and inputs these graphics pixels to pixel mux 32.

Movie pixels are also read from graphics memory 56 into YUV path 34, which is a second pipeline which scales the movie pixels to fit the size of the movie window, and converts the YUV pixels to the RGB color space. Pixel mux 32 selects these converted movie pixels when the movie window is being scanned to the screen, but otherwise selects graphics pixels from RGB path 36. The parent application provides more details on the control of pixel mux 32 and YUV path 34 and RGB path 36.

The movie pixels from YUV path 34 or the graphics pixels from RGB path 36 are selected by pixel mux 32 and passed to CRT path 38. CRT path 38 contains a digital-to-analog converter (DAC) which converts the binary data representing each pixel into analog voltages which drive the CRT's electron gun which generates the red, green, and blue pixels. CRT 24 then displays the pixels.

Before the pixels are converted to analog voltages, they are copied to LCD path 30. LCD path 30 performs shading and dithering such as gray-scaling, and other formatting before the pixels are sent to the flat-panel LCD panel 22.

YUV Path May Be Used To Double Pixel Bandwidth

The parent application disclosed a single pixel mux 32, which selects either the movie pixels or the graphics pixels for simultaneous display on both external CRT 24 and LCD panel 22. While this apparatus is effective for video overlay, the inventor has realized that the video overlay logic in the graphics controller may be modified slightly and used to double the available pixel bandwidth to the displays. The parent application disclosed a single pixel mux for selecting either YUV movie pixels or RGB graphics pixels for simultaneous display by the external CRT and the LCD flat panel. The inventor has realized that adding a second pixel mux allows the CRT and LCD paths to be decoupled. This decoupling allows different images to be displayed on the LCD flat panel display and the external CRT.

Figure 5:
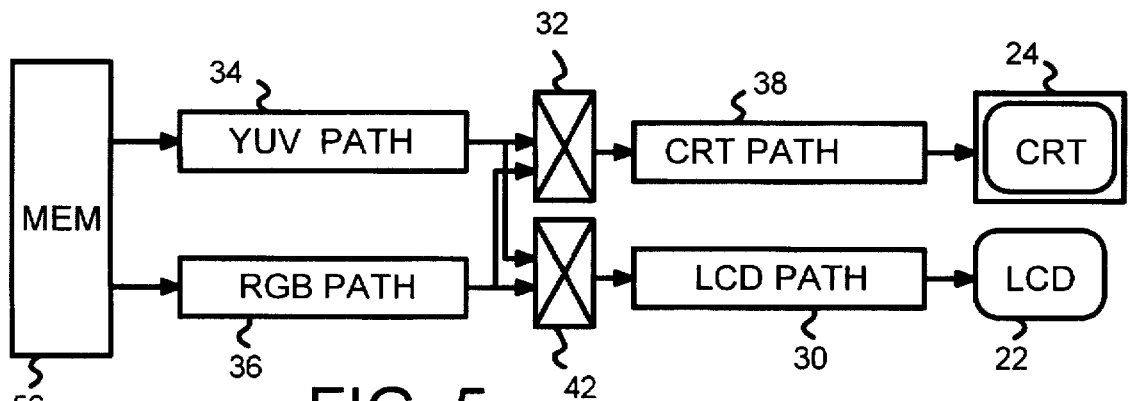
FIG. 5 shows that a second pixel mux is used to load pixels to the LCD flat panel separately and independently of the loading of pixels to the CRT.

FIG. 5 shows that a second pixel mux 42 is used to load pixels to the LCD flat panel separately and independently of the loading of pixels to the CRT. Pixel mux 32 selects either graphics pixels from RGB path 36 or movie pixels from YUV path 34. Pixel mux 42 likewise selects either graphics pixels from RGB path 36 or movie pixels from YUV path 34. Pixel mux loads pixels to CRT path 38 for display by external CRT 24, while the separate pixel mux 42 selects pixels for LCD path 30 for display by LCD panel 22.

Pixel mux 32 is operated and controlled separately from pixel mux 42, allowing either the same or different images to be displayed on external CRT 24 and LCD panel 22. When pixel muxes 32, 42 select the same pixels from either YUV path 34 or RGB path 36, then the same image is displayed on both CRT 24 and LCD panel 22. This mode is known as 'simulscan'.

Movie pixels from YUV path 34 may be scaled up to fit the entire display screen. In that case, no graphics pixels from RGB path 36 are needed. Pixel mux 32 may select a full screen of movie pixels from YUV path 34 for display by external CRT 24, while pixel mux 42 selects graphics pixels from RGB path 36 for display on LCD panel 22. Thus a full-screen movie is displayed on external CRT 24 while normal computer graphics data is shown on the local flat-panel LCD panel 22. This allows the speaker's notes to be discreetly viewed on the local flat-panel LCD while a presentation of frames of movie pixels is displayed to an audience on the external CRT. External CRT 24 can display an entirely different image than LCD panel 22.

YUV path 34 is modified to also operate on normal RGB graphics pixels as well as YUV movie pixels. Color-space conversion from YUV to RGB is disabled when RGB pixels are fetched from graphics memory 56 to YUV path 34. Some of the attribute modification to the RGB pixels in RGB path 36 is not available when RGB pixels are staged through YUV path 34. Thus YUV path 34 can act as a second path for graphics pixels when movie pixels are not being transferred. Graphics memory 56 must have a high bandwidth to supply graphics pixels to both RGB path 36 and YUV path 34, but support for YUV video overlay already requires a higher bandwidth since both graphics and movie pixels must be fetched. In a preferred embodiment, graphics memory 56 has a 128-bit datapath to provide a high bandwidth.

When YUV path 34 is used to transfer graphics pixels, then two different graphics images may be displayed. A first image of graphics pixels is fetched from graphics memory 56 to RGB path 36, and pixel mux 42 selects these pixels for display on LCD panel 22. A second image of graphics pixels is simultaneously fetched from graphics memory 56 to YUV path 34, and pixel mux 32 selects these for display on external CRT 24. Thus two different images of computer-generated graphics may be displayed because two paths are provided from graphics memory 56 to the two displays.

Figure 6:
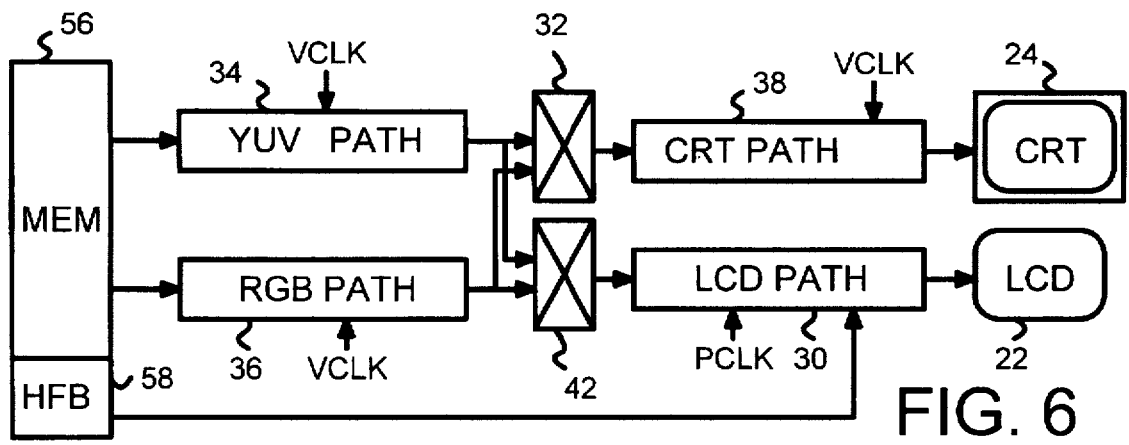
FIG. 6 illustrates a graphics controller with a separate panel clock for the LCD path which allows a different refresh rate for the CRT and LCD.

FIG. 6 illustrates a graphics controller with a separate panel clock for the LCD path which allows a different refresh rate for the CRT and LCD. YUV path 34, RGB path 36, and CRT path 38 all use a pixel or video clock VCLK to clock pixels through pipeline stages. This video clock VCLK is the rate pixels are transferred to external CRT 24. LCD path 30 receives a panel clock, which may be asynchronous to VCLK. This allows LCD panel 22 to receive pixels at a different rate than CRT 24, even though most of the graphics controller operates at the rate of the CRT's clock, VCLK. Of course, there are some limits to the difference in the rates of VCLK and PCLK, depending on the capacity of buffering in LCD path 30.

Graphics memory 56 also contains a half-frame buffer 58 which is used to buffer half of the frame being displayed. This is used for dual flat panel LCD's, which require two feeds of pixels to increase the refresh rate as is well-known in the art.

MODES OF OPERATION—FIGS. 7A–C

FIGS. 7A, 7B, 7C highlight several modes of operation of the dual graphics controller including simultaneous and dual modes. FIG. 7A highlights simultaneous display mode, where the same image is displayed on both external CRT 24 and LCD panel 22. Pixel muxes 32, 42 both select the same pixels from RGB path 36 for transfer to the displays through CRT path 38 and LCD path 30.

During simultaneous movie mode (not shown), when pixels inside the movie window are being transferred, pixel muxes 32, 42 of FIG. 7A both switch to select movie pixels from YUV path 34 as described in detail in the parent application. This movie window can be less than the entire screen, or full screen where no graphics pixels are displayed. Thus simultaneous mode can display a full screen of graphics pixels, a full screen of movie pixels, or a graphics screen with a smaller window of movie pixels.

FIG. 7B highlights dual mode, where different images are displayed on external CRT 24 and local LCD panel 22. Graphics pixels are fetched from graphics memory 56 to RGB path 36. These graphics pixels are selected by pixel mux 42 and sent to LCD panel 22 through LCD path 30.

At the same time, movie pixels or graphics pixels are fetched from graphics memory 56 to YUV path 34. Pixel mux 32 selects these pixels from YUV path 34 and displays them on external CRT 24 after transfer through CRT path 38. The image displayed on external CRT 24 is a full-screen video image when YUV pixels are fetched. When RGB graphics pixels are fetched, the image displayed is a standard graphics image. The image cannot be a combination of a smaller movie window on a graphics background unless additional logic is added.

Dual mode thus allows two completely different images to be displayed on the two displays.

FIG. 7C shows that the pixel mux selection can be reversed for reverse-dual mode. Reverse-dual mode is similar to dual mode described for FIG. 7B, except that pixel mux 32 select the graphics pixels from RGB path 36 for display on external CRT 24. Pixel mux 42 selects movie or graphics pixels from YUV path 34 for display on LCD panel 22. Thus dual mode allows the movie to be displayed on external CRT 24, while reverse-dual mode allows the movie to be displayed on local LCD panel 22.

The dual graphics controller is flexible as FIGS. 7A, 7B, 7C show since with a simple mode change the same hardware can be used to display the movie on either display, or the same image may be displayed simultaneously on both displayed, with or without a movie overlay window.

DETAIL OF DUAL GRAPHICS CONTROLLER

FIGS. 8A, 8B are a detailed block diagram of the dual graphics controller which can display the same or different images on the two displays. A host bus such as a PCI bus on the host PC transfers data to and from graphics memory 56 through a memory controller (not shown) which controls and arbitrates access to graphics memory 56 of FIG. 8A.

Graphics memory 56 may require periodic refreshing to prevent data loss from leakage in the dynamic memory chips in graphics memory 56. Block transfers and manipulation of the video data in graphics memory 56 may be accomplished by a BLT engine.

The memory controller writes pixel data from graphics memory 56 to CRT FIFO 58 for refreshing CRT monitor 24 and/or LCD panel 22. Data may also be written to a half-frame buffer, which buffers half of the screen when a dual-scan LCD screen is used. CRT FIFO 58 is the first stage in the pipeline for RGB path 36.

Pixel data is transferred from CRT FIFO 58 to attribute controller 61 using the video clock VCLK. Attribute controller 61 may re-map or alter the color represented by the pixel data by using a color look-up table. Other attributes, such as blinking or reverse-video characters may be applied by attribute controller 61.

RAM look-up table 60 receives the modified pixel data from attribute controller 61. RAM look-up table 60 contains a RAM that is indexed by the pixel data, and outputs digital values for red, green, and blue sub-pixels that comprise a color pixel. RAM look-up may be used to expand the color palate available by re-mapping the colors of the pixels. Attribute mux 54 is used to bypass attribute controller 61 when attributes are not used.

YUV/RGB Path

Movie pixel data in YUV format is loaded from a movie overlay region of graphics memory 56 into movie FIFO 62. The movie overlay memory can be constructed from the same memory chips as graphics memory 56. The same memory controller can transfer movie pixels from movie overlay region of graphics memory 56 to movie FIFO 62 without the need of a separate movie controller.

Movie pixels loaded into movie FIFO 62 are clocked by the video clock to scaler 64 and color-space converter 66. Scaler 64 expands the movie pixels to fit the size of the movie window which may be modified by the user. Scaler 64 may interpolate between adjacent pixels in the x or y direction to generate new, intermediate pixels to expand the number of pixels to fit the desired window size. Scaler 64 may also be set to full-screen, in which case the movie pixels are duplicated or interpolated as much as needed to fit the entire screen. Color-space converter 66 converts the YUV movie pixels from the YUV color space to the RGB color space. When RGB pixels are transferred through YUV path 34, then color space mux 68 is used to bypass color-space converter 66 so that the RGB pixels are not converted.

Dual Pixel Muxes

Two pixel muxes are provided. Pixel muxes 32, 42 independently select either movie overlay data from YUV path 34 or graphics pixels from RGB path 36. Pixel mux 32 outputs selected pixels to CRT path 38 while pixel mux 42 outputs selected pixels to LCD path 30.

Hardware cursor and icon-drawing logic is provided by HWC logic 53 and icon overlay logic 52. The memory controller transfers video data representing the cursor or icons to and from HWC logic 53, icon overlay logic 52, and graphics memory 56. Pixel muxes 32, 42 select cursor pixels from HWC logic 53 or icon pixels from icon overlay logic 52 under control of mux control logic 67, which determines when pixel muxes 32, 42 need to switch over to the cursor or icon for overlay. Compare logic (not shown) can be used to determine when the pixel muxes need to switch to the cursor or icon pixels. Typically the hardware cursor and icons are small, requiring few pixels, but they are often moved and thus having separate overlay logic improves performance and quickens the cursor response time. Multiple icons may be individually switched to either or both LCD panel 22 and CRT 24.

Mux control logic 67 switches both pixel muxes 32, 42 with the same control values when simultaneous mode is active, perhaps switching from graphics pixels from RGB path 36 to movie pixels from YUV path 34 when the movie window, MVE WIN, is signaled from compare logic described in detail in the parent application. When dual mode is signaled, mux control logic 67 switches pixel mux 32 independently of pixel mux 42 so that two different images are displayed on external CRT 24 and LCD panel 22. The hardware cursor and icons may be switched in to either or both displays as needed.

An 8-bit register is used to generate the control bits to mux control logic 67. The 8-bit register is programmable by the graphics driver software which programs in the mode desired. The register contains two 4-bit fields, one for LCD and one for CRT. Each 4-bit field has a bit for selecting the RGB path, another for selecting the YUV movie path, one bit for enabling the cursor and the fourth bit for enabling the icon. The bits in the two 4-bit fields are programmed with identical 4-bit values for simultaneous display, but different values for dual-display mode.

CRT and LCD Paths

Continuing onto FIG. 8B, pixel mux 32 transfers pixels to CRT path 38 while pixel mux 42 transfers pixels to LCD path 30. CRT path 38 latches pixels with flip-flop 74, which is clocked by VCLK. DAC 72 is a digital-to-analog converter (DAC) that converts the digital color sub-pixels to analog intensity values that are transmitted to external CRT 24. The video clock VCLK is used to create the analog output to CRT 24 by timing the transfer of the analog pixel intensity data outputted.

Digital pixel data in RGB format from pixel mux 42 is latched to LCD path 30 by flip-flop 75. Flip-flop 75 also is clocked by VCLK in the embodiment of FIG. 8B. Gray-scale controller 78 includes shading and dithering logic used to mimic a larger color palate. Gray-scale controller 78 may perform a gray-scale conversion of the color sub-pixels if LCD panel 22 is monochrome or color, or may perform some other conversion or dithering of the pixel data to a format accepted by LCD panel 22. The converted pixel data from Gray-scale controller 78 is formatted by formatter 80 and then clocked into LCD panel 22 using the video clock VCLK. LCD panel 22 may itself include some additional control or conversion logic to manipulate the pixel data before its is visually displayed on a screen, and it may be of many different types or technologies. When LCD panel 22 is of the dual-panel type, pixel data is also supplied by an indirect path from a half-frame buffer in graphics memory 56 or in a separate buffer.

DUAL REFRESH RATES—FIG. 9

Figure 9:
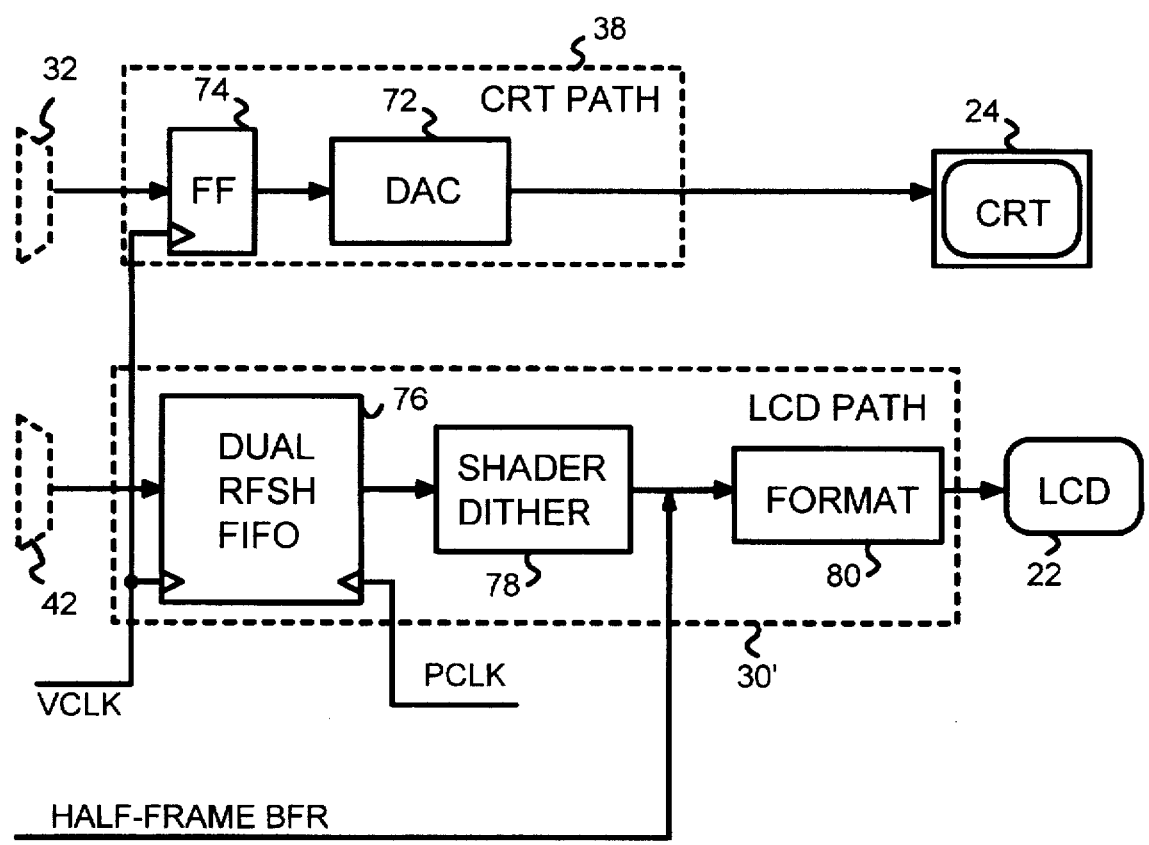
FIG. 9 is an alternate embodiment of the dual graphics controller of FIG. 8B which allows for separate refresh rates of the CRT and LCD displays.

FIG. 9 is an alternate embodiment of the dual graphics controller of FIG. 8B which allows for separate refresh rates of the CRT and LCD displays. All four paths 34', 36, 38, 30 of FIGS. 8A, 8B are clocked by the same pixel or video clock VCLK. Since both CRT path 38 and LCD path 30 are clocked by the same clock VCLK, the refresh rates of CRT 24 and LCD panel 22 must be identical for FIG. 8B. For dual-scan LCD flat-panels, for the same VCLK rate, the refresh rate of the panel is twice the CRT's refresh rate.

A second clock may be applied to LCD path 30' to refresh LCD panel 22 at a slightly different rate than CRT 24. Pixel data from pixel mux 42 is latched into dual-refresh FIFO 76 rather than a simple flip-flop. If pixels are read out of YUV path 34 and RGB path 36 at different rates, then the LCD and CRT displays are refreshed at different rates.

Another alternative is that dual-refresh FIFO 76 latch in pixels from pixel mux 42 using VCLK, the same clock as the upstream YUV path 34 and RGB path 36. However, pixels are clocked out of dual-refresh FIFO 76 using the second clock, the panel clock PCLK. PCLK may be asynchronous to VCLK, but the storage capacity of dual-refresh FIFO 76 limits the difference between VCLK and PCLK because over-run or under-run of dual-refresh FIFO 76 may occur when PCLK is too much faster or slower than VCLK. Dual-refresh FIFO 76 may be designed to accept a single pixel per VCLK pulse, but transfer out several pixels for each PCLK cycle.

Gray-scale controller 78 and formatter 80 are also clocked by PCLK, and thus pixel data is transferred to LCD panel 22 at a rate determined by PCLK rather than VCLK. Thus LCD panel 22 may be refreshed at a different rate than CRT 24. This allows for a higher-resolution external CRT 24 to be used, which requires a higher-frequency VCLK to clock more pixels and lines of pixels to the higher-resolution CRT. Since LCD panel 22 has a lower resolution, fewer pixels are needed. Thus PCLK can operate at a lower frequency than VCLK, and dual-refresh FIFO 76 can buffer pixels to the slower PCLK. RGB path 36 may be used to supply pixels to LCD path 30' using VCLK, while YUV path 34 is used to supply pixels to CRT path 38 which also operate at the faster VCLK.

The horizontal and vertical clocks to LCD panel 22 must be generated separately from the horizontal and vertical sync signals to external CRT 24 when completely different refresh rates are desired. When separate refresh rates are not used, then the same clock generation logic may be used to drive both displays.

ADVANTAGES OF THE INVENTION

The dual graphics controller is flexible since with a simple mode change the same hardware can be used to display the movie on either display, or the same image may be displayed simultaneously on both displays, with or without a movie overlay window. Different images may also be displayed on the CRT and the LCD panel.

Figure 10A:
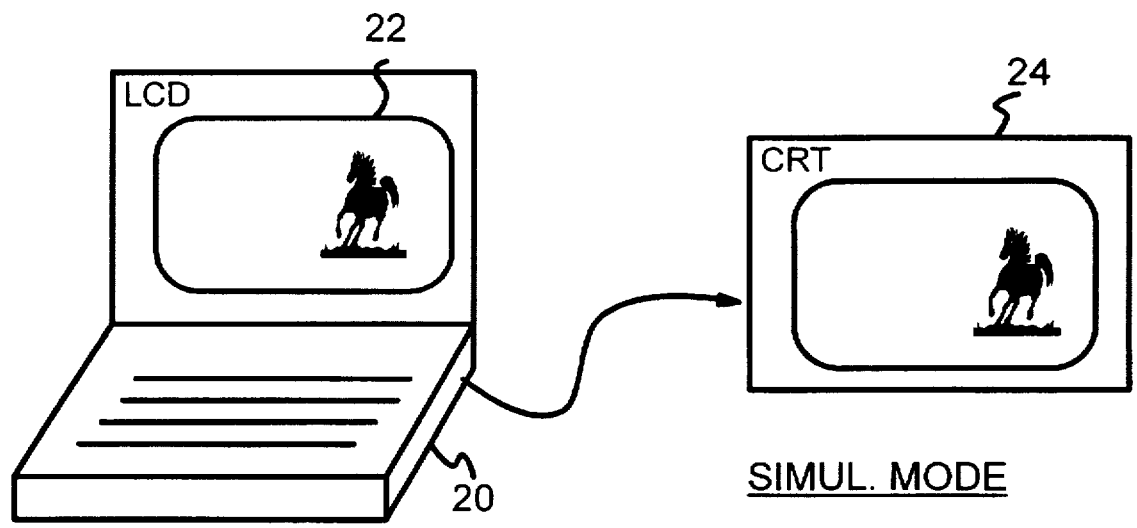
FIGS. 10A, 10B, 10C illustrate some of the display modes that are supported by the dual graphics controller.
Figure 10B:
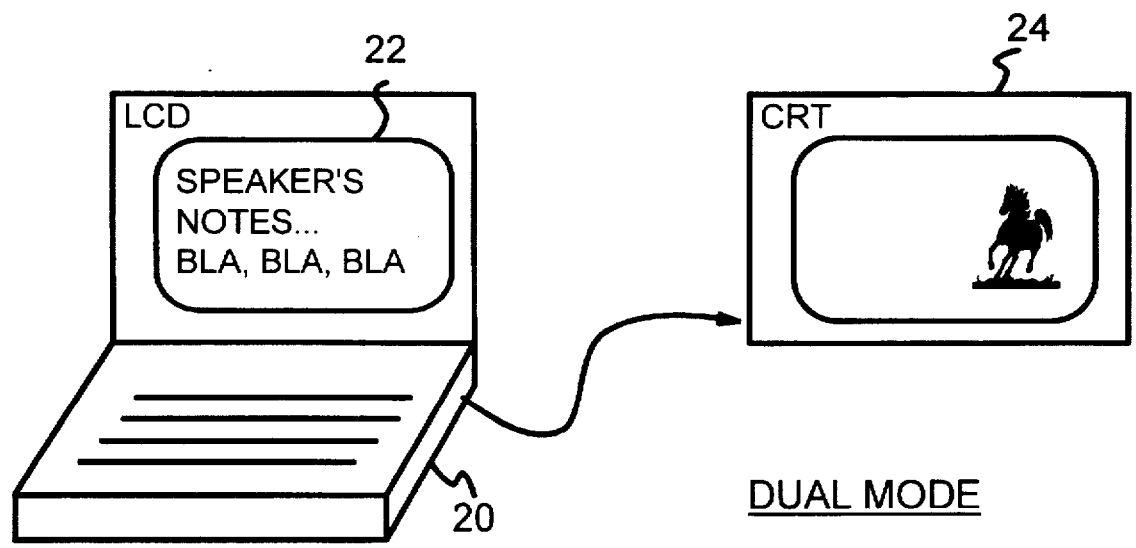
Figure 10C:
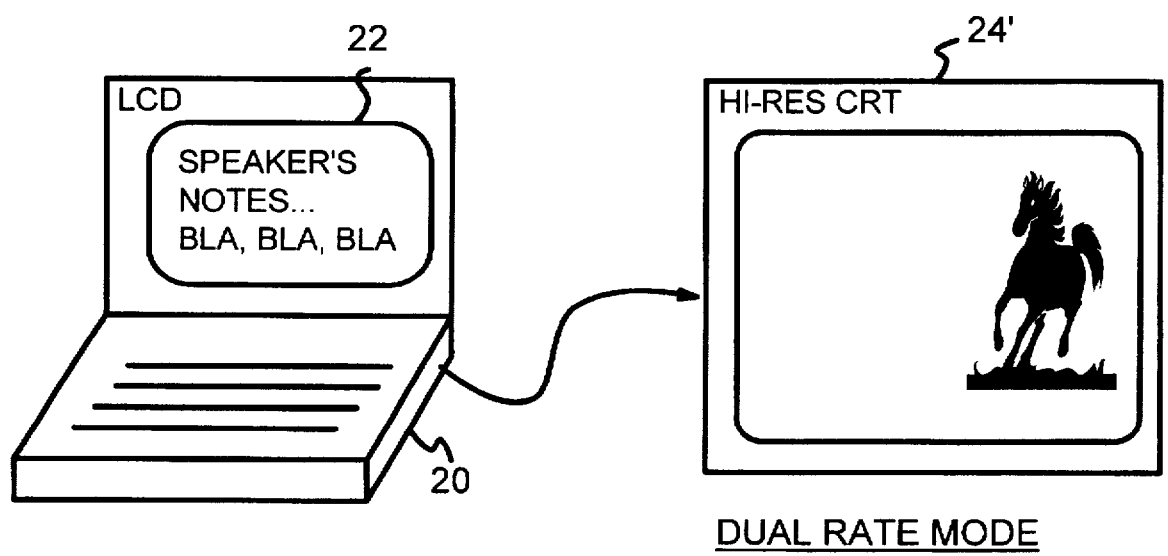

FIGS. 10A, 10B, 10C illustrate some of the display modes that are supported by the dual graphics controller. FIG. 10A shows simultaneous mode, where identical images are displayed on external CRT 24 and LCD panel 22. A single graphics controller in laptop PC 20 drives both displays. The image displayed may be all graphics data, or graphics data with a smaller movie-overlay window displayed. The image may also be a full-screen movie-overlay where all graphics data is covered up by the full-screen movie window.

The dual graphics controller in laptop PC 20 may also drive two different images onto external CRT 24 and LCD panel 22, as FIG. 10B shows. This is called dual mode. External CRT 24 displays a full-screen movie overlay image while LCD panel 22 shows graphics data such as speaker's notes. Graphics and movie data are displayed on separate displays in dual mode. The image could also be reversed on the two displays.

FIG. 10C shows dual-rate mode, where a high-resolution CRT 24' is driven by the dual graphics controller in laptop PC 20. The alternate embodiment of FIG. 9 allows different refresh rates to be used for high-resolution CRT 24' and the lower-resolution LCD panel 22. A different image is shown on high-resolution CRT 24' than on LCD panel 22. A full-screen movie overlay is shown on high-resolution CRT 24', but speaker's notes generated from graphics pixels are shown on LCD panel 22. In this case the data taken out of the YUV path is at a different rate than the RGB path.

Graphics data rather than the movie data could be shown on high-resolution CRT 24' by sending RGB graphics pixels through YUV path 34 rather than YUV movie pixels. The pixel muxes could also reverse their inputs so that the full-screen movie overlay is shown on LCD panel 22 while the graphics data is shown on high-resolution CRT 24'.

Table 1 below shows some of the display modes that are possible with the dual graphics controller.

TABLE 1

Display Modes

| Mode | YUV path 34 | RGB path 36 | CRT Displays | LCD Displays |
|---|---|---|---|---|
| Simul-GPX | Not Used | Graphics | Graphics | Graphics |
| Simul-MVE | Movie | Not Used | Movie | Movie |
| Simul-GPX/MVE | Movie | Graphics | Graphics/Movie | Graphics/Movie |
| Dual | Movie | Graphics | Movie | Graphics |
| Reverse-Dual | Movie | Graphics | Graphics | Movie |
| Dual-GPX | 2nd Graphics | Graphics | Graphics | 2nd Graphics |
| Dual-Rates | Movie-HiRES | Graphics | Movie-HiRES | Graphics |
| Reverse-Dual-Rates | Movie | Graphics-HiRES | Graphics-HiRES | Movie |
| Dual-Rates-GPX | 2nd Graphics | Graphics | Graphics | 2nd Graphics |

Thus a single graphics controller in a portable PC can drive two different images—one for the audience on the external CRT and a second for the speaker on the portable PC's LCD panel display. The added cost for the second pixel mux is minimal and thus the dual graphics controller can be placed in a standard laptop PC with minimal added cost.

ALTERNATE EMBODIMENTS

Several other embodiments are contemplated by the inventor. For example the various blocks of the video sub-system may be integrated onto one or more silicon substrates, depending upon the technology used. The DAC may be a separate IC or integrated with the rest of the graphics controller. The invention has been described in terms of a combined CRT and LCD controller for a portable PC, but the invention could apply to desktop computers that are designed to be energy-efficient or for driving presentations. A full-frame buffer may be used rather than a half-frame buffer, and the gray-scale controller may be deleted so that the graphics controller drives the LCD screen directly. This is often true for thin-film-transistor (TFT) display screens. A television monitor rather than a CRT monitor may be driven. Two different CRT monitors, or two different flat-panel displays may be driven rather than one CRT and one flat-panel. With two identical monitors, twice the graphics area may be displayed.

The movie window, sometimes known as full-motion video, may actually be a relatively static image such as images from a slide show. However, the pixel data for the movie window is in YUV format rather than RGB format, as is thus stored separately from the RGB graphics data, either in a separate memory, or in a separate part of the frame buffer graphics memory. Two or more movie windows may be separately overlaid onto the graphics data by additional logic, or preferably re-use of the existing logic. The YUV movie data may also be stored as part of the graphics data.

The preferred embodiment used the PCI bus, but other host busses such as VESA, EISA, or ISA (AT) may be used. Many implementations of the logic disclosed herein is possible. The video or graphics memory is preferably constructed of dynamic RAM chips, but more expensive Video RAM (VRAM) chips or other types of memory chips may be used.

Another alternate embodiment is to use pixel clocks that are character clocks. A character is typically 8 pixels, so a character clock is simply a divided-down pixel clock. The graphics memory is preferably single-ported, with the access port being shared by the RGB and YUV paths. The CRT may be lower resolution than the LCD display, and the modes changed accordingly. Many combinations of the sizes of the movie and graphics pixels are possible, such as 8 or 16 bits per pixel. The RGB pixels sent through the YUV path may be 16-bit pixels while the RGB pixels sent through the RGB path may be 8-bit pixels. Alternately, both pixels may be 8-bit or both may be 16-bit.

When images of different resolutions are to be displayed on both the CRT and flat panel, a limited-size video memory may be used. The panel is set to 1024×768×64K color resolution, while the CRT is set to 800×600×256 colors. The extra 1024−768=256 lines are blanked to the CRT, and 768−600=168 pixels are blanked to the CRT for each line. Programming registers may be used to set the number of lines and pixels per line to blank. Interpolation of pixels and lines may also be used to adjust the display size. Such interpolation logic exists in the YUV path.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

I claim:

1. A dual-path graphics controller for driving pixels to a flat-panel display and a cathode-ray-tube (CRT) monitor, the dual-path graphics controller comprising:

a first path, coupled to a graphics memory storing pixels for display, for receiving graphics pixels from the graphics memory, the first path having a first output;

a second path, coupled to the graphics memory, for receiving movie-overlay pixels from the graphics memory, the second path having a second output;

a first pixel mux, coupled to the first output and coupled to the second output, for selecting graphics pixels from the first output or movie-overlay pixels from the second output, the first pixel mux having a first mux output;

a second pixel mux, coupled to the first output and coupled to the second output, for selecting graphics pixels from the first output or movie-overlay pixels from the second output, the second pixel mux having a second mux output;

a CRT path, coupled to the first mux output of the first pixel mux, for transferring pixels to the CRT monitor;

a panel path, coupled to the second mux output of the second pixel mux, for transferring pixels to the flat-panel display;

simultaneous control means, coupled to the first pixel mux and coupled to the second pixel mux, for causing both the first and the second pixel muxes to select graphics pixels from the first path when graphics data is displayed, but selecting movie-overlay pixels from the second path when movie-overlay data is displayed, the CRT monitor displaying a same image as displayed on the flat-panel display when the simultaneous control means is active; and dual control means, coupled to the first pixel mux and coupled to the second pixel mux, for causing the first and the second pixel muxes to select different pixels, the second pixel mux selecting graphics pixels from the first path but the first pixel mux selecting movie-overlay pixels from the second path when graphics data is displayed on the flat-panel display and movie-overlay data is displayed on the CRT monitor, the CRT monitor displaying a different image than an image displayed on the flat-panel display when the dual control means is active;

whereby different images or the same image are displayed on the CRT monitor and the flat-panel display.

2. The dual-path graphics controller of claim 1 wherein the first path and the second path each comprise a pipeline containing a plurality of stages for transferring pixels in response to a pixel clock, the first path receiving the pixel clock and the second path receiving the pixel clock.

3. The dual-path graphics controller of claim 2 wherein the first path includes a first buffer for buffering graphics pixels from the graphics memory and wherein the second path includes a second buffer for buffering movie-overlay pixels from the graphics memory, the first buffer and the second buffer outputting pixels in response to the pixel clock.

4. The dual-path graphics controller of claim 3 wherein the CRT path includes a digital-to-analog converter (DAC) for converting digital graphics pixels to analog voltages for output to the CRT monitor, the DAC outputting a pixel in response to the pixel clock.

5. The dual-path graphics controller of claim 4 wherein the first path includes a RAM look-up table for re-mapping a color of a graphics pixel, whereby the RAM look-up table is in the first path before the first pixel mux but the DAC is in the CRT path after the first pixel mux.

6. The dual-path graphics controller of claim 5 wherein the panel path receives the pixel clock, the panel path formatting pixels from the second pixel mux in response to the pixel clock.

7. The dual-path graphics controller of claim 6 further comprising a clock generator for generating the pixel clock, the clock generator including:

horizontal clock means for generating a horizontal line clock by dividing the pixel clock;

vertical clock means for generating a vertical clock by dividing the horizontal line clock, the vertical clock indicating when a new frame of pixels is to begin, the new frame including a plurality of horizontal lines signaled by the horizontal line clock;

output means for outputting the vertical clock and the horizontal line clocks to the CRT monitor and to the flat-panel display, whereby the CRT monitor and the flat-panel display are refreshed synchronously to each other.

8. The dual-path graphics controller of claim 5 wherein the panel path receives a panel clock, the panel path formatting pixels from the second pixel mux in response to the panel clock, the panel path further comprising a panel FIFO, the panel FIFO receiving pixels from the second pixel mux in response to the pixel clock, panel FIFO outputting pixels in response to the panel clock, whereby the flat-panel display receives pixels at a rate of the panel clock while the CRT monitor receives pixels at a rate of the pixel clock.

9. The dual-path graphics controller of claim 1 wherein the second path includes a color-space converter for converting YUV moving-video pixels fetched from the graphics memory to RGB pixels, the second output outputting RGB pixels as converted movie-overlay pixels.

10. The dual-path graphics controller of claim 9 wherein the second path further comprises a scaler for scaling pixels, the scaler increasing the number of pixels by interpolating pixel color of adjacent pixels, the scaler increasing the number of pixels to fit a width of a movie-overlay window.

11. The dual-path graphics controller of claim 9 wherein the second path further comprises bypass means for bypassing the color-space converter when RGB pixels are fetched from the graphics memory to the second path, whereby the second path transfers converted YUV pixels or RGB pixels and whereby a two different graphics images are displayed when the dual control means is active.

12. The dual-path graphics controller of claim 1 further comprising:

hardware cursor means, coupled to the first pixel mux and coupled to the second pixel mux, for generating cursor pixels for displaying a cursor overlay, the first pixel mux selecting the cursor pixels when the cursor overlay is to be displayed on the CRT monitor, the second pixel mux selecting the cursor pixels when the cursor overlay is to be displayed on the flat-panel display, whereby the cursor overlay is separately selected for display on the CRT monitor and the flat-panel display.

13. The dual-path graphics controller of claim 12 wherein the panel path includes a panel controller for shading and dithering pixels before output to the flat-panel display.

14. The dual-path graphics controller of claim 1 further comprising:

icon means, coupled to the first pixel mux and coupled to the second pixel mux, for generating icon pixels for displaying an icon overlay, the first pixel mux selecting the icon pixels when the icon overlay is to be displayed on the CRT monitor, the second pixel mux selecting the icon pixels when the icon overlay is to be displayed on the flat-panel display, whereby the icon overlay is separately selected for display on the CRT monitor and the flat-panel display.

15. A multi-mode display controller comprising:

a graphics memory port for fetching pixels from a graphics memory;

a graphics pixel pipeline for buffering pixels fetched from the graphics memory;

a movie-overlay pipeline for buffering overlay pixels fetched from the graphics memory;

a first display pipeline for formatting and transferring pixels to a first display;

a second display pipeline for formatting and transferring pixels to a second display;

a first mux coupled to select either pixels output from the graphics pipeline or pixels output from the movie-overlay pipeline, the first mux coupled to transfer selected pixels to the first display pipeline;

a second mux coupled to select either pixels output from the graphics pipeline or pixels output from the movie-overlay pipeline, the second mux coupled to transfer selected pixels to the second display pipeline;

a clock generator for generating horizontal and vertical clocks to the first and second display;

a mode controller coupled to control the first mux and the second mux, the mode controller including:

simultaneous mode means, coupled to the first and second mux,
  (a) for signaling the first mux and the second mux to both select pixels output from the graphics pixel pipeline when graphics pixels are to be displayed;
  (b) for signaling the first mux and the second mux to both select pixels output from the movie-overlay pipeline when movie-overlay pixels are to be displayed;

dual mode means, coupled to the first and second mux,
  (c) for signaling the first mux to select pixels output from the graphics pixel pipeline and for signaling the second mux to select pixels output from the movie-overlay pipeline;

whereby a same image is displayed on the first display and on the second display when the simultaneous mode means controls the first and second mux, but two different images are displayed on the first display and on the second display when the dual mode means controls the first and second mux.

16. The multi-mode display controller of claim 15 wherein the first display is a flat-panel display and wherein the second display is a CRT monitor.

17. The multi-mode display controller of claim 15 wherein the clock generator generates a pixel clock to the graphics pixel pipeline and to the movie-overlay pipeline and to the first display pipeline.

18. The multi-mode display controller of claim 15 wherein the movie-overlay pipeline includes scaling means for increasing a number of pixels, wherein additional pixels generated in the movie-overlay pipeline are output to the first mux and the second mux.

19. The multi-mode display controller of claim 18 wherein the movie-overlay pipeline includes pixel conversion means for converting YUV pixels to RGB pixels for output to the first mux and the second mux.

20. A dual-path graphics controller for driving pixels to a flat-panel display and a cathode-ray-tube (CRT) monitor, the dual-path graphics controller comprising:

a first path, coupled to a graphics memory storing pixels for display, for receiving graphics pixels from the graphics memory, the first path having a first output;

a second path, coupled to the graphics memory, for receiving movie-overlay pixels from the graphics memory, the second path having a second output;

a first pixel mux, coupled to the first output and coupled to the second output, for selecting graphics pixels from the first output or movie-overlay pixels from the second output, the first pixel mux having a first mux output;

a second pixel mux, coupled to the first output and coupled to the second output, for selecting graphics pixels from the first output or movie-overlay pixels from the second output, the second pixel mux having a second mux output;

a CRT path, coupled to the first mux output of the first pixel mux, for transferring pixels to the CRT monitor;

a panel path, coupled to the second mux output of the second pixel mux, for transferring pixels to the flat-panel display;

simultaneous control means, coupled to the first pixel mux and coupled to the second pixel mux, for causing both the first and the second pixel muxes to select graphics pixels from the first path when graphics data is displayed, but selecting movie-overlay pixels from the second path when movie-overlay data is displayed, the CRT monitor displaying a same image as displayed on the flat-panel display when the simultaneous control means is active; and reverse-dual control means, coupled to the first pixel mux and coupled to the second pixel mux, for causing the first and the second pixel muxes to select different pixels, the first pixel mux selecting graphics pixels from the first path but the second pixel mux selecting movie-overlay pixels from the second path when graphics data is displayed on the CRT monitor and movie-overlay data is displayed on the flat-panel display, the CRT monitor displaying a different image than an image displayed on the flat-panel display when the dual control means is active;

whereby different images or the same image are displayed on the CRT monitor and the flat-panel display.

* * * * *